United States Patent [19]

Rambaud, deceased

[11] Patent Number: 4,581,259

[45] Date of Patent: Apr. 8, 1986

[54] COMPOSITION AND METHOD FOR COATING OBJECTS OF ACRYLIC RESIN AND COATED OBJECTS THUS OBTAINED

[76] Inventor: Jean-Michel Rambaud, deceased, 18 rue de la Paix, 74000 Annecy, France, by Jacques Autour, legal representative

[21] Appl. No.: 643,369

[22] Filed: Aug. 23, 1984

[30] Foreign Application Priority Data

Aug. 24, 1983 [FR] France ............................ 83 13659

[51] Int. Cl.$^4$ ...................... B05D 3/12; C09J 7/02; C08K 5/02
[52] U.S. Cl. ............................ 427/350; 427/393.5; 428/520; 264/101; 264/331.21; 264/DIG. 78; 524/364
[58] Field of Search .................. 524/364; 428/520; 427/350, 393.5; 264/101, 331.21, DIG. 78

[56] References Cited

U.S. PATENT DOCUMENTS

| | | | |
|---|---|---|---|
| 2,623,027 | 12/1952 | Deniston et al. | 524/364 |
| 2,949,445 | 8/1960 | Blake | 524/364 |
| 3,446,769 | 5/1969 | Opipari | 524/364 |
| 3,801,354 | 4/1974 | Rist | 428/520 |
| 3,804,663 | 4/1974 | Clark | 427/393.5 |
| 3,841,903 | 10/1974 | Huang et al. | 428/520 |
| 4,042,732 | 8/1977 | Ferrar | 428/520 |
| 4,103,065 | 7/1978 | Gagnon | 428/520 |
| 4,141,771 | 2/1979 | Barker et al. | 428/520 |
| 4,291,097 | 9/1981 | Kamada et al. | 428/520 |
| 4,350,742 | 9/1982 | Hall et al. | 428/520 |
| 4,377,611 | 3/1983 | Fischer et al. | 428/520 |
| 4,404,308 | 9/1983 | Ragas et al. | 427/393.5 |
| 4,477,519 | 10/1984 | Frye | 427/214 |

FOREIGN PATENT DOCUMENTS 2827332 10/1980 Fed. Rep. of Germany .
1145880 3/1969 United Kingdom .

Primary Examiner—Joseph L. Schofer
Assistant Examiner—N. Sarofin
Attorney, Agent, or Firm—Pollock, Vande Sande & Priddy

[57] ABSTRACT

A composition for the application of coatings on a substrate having a base of acrylic resin, comprising polymethylmethacrylate dissolved in a solvent composed of at least one ketone selected from methylethylketone and diacetone alcohol and of a chlorinated hydrocarbon selected from trichloroethylene and methylene chloride, the ratio of the volume of chlorinated hydrocarbon to the volume of ketone being at least 20 to 80.

12 Claims, No Drawings

COMPOSITION AND METHOD FOR COATING OBJECTS OF ACRYLIC RESIN AND COATED OBJECTS THUS OBTAINED

BACKGROUND OF THE INVENTION

1. Field of the Invention

This invention relates to a composition and a method for coating objects having a base of acrylic resin, especially polymethylmethacrylate.

2. Description of the Prior Art

Acrylic resins and in particular polymethylmethacrylate are employed among other things for the manufacture of sanitary equipment such as bathtubs, for example. It is often desirable to provide objects of this type with coatings for such purposes as decoration, protection or reinforcement.

In order to coat these objects, attempts have already been made to use materials consisting at least partly of acrylic resin. Coatings of this type should exhibit perfect adhesion to the substrate, in particular when this latter has a base of polymethylmethacrylate. The coatings are usually applied in the form of a composition which comprises an acrylic resin dissolved in a chlorinated solvent and which may include additives such as pigments and/or fillers.

However, it has never been possible to obtain satisfactory adhesion. The coating frequently separates from the substrate at certain points under the action of impacts or thermal cycles.

DETAILED DESCRIPTION OF THE INVENTION

One aim of the invention is to overcome this disadvantage.

Another aim of the invention is to obtain objects of the type defined in the foregoing by thermoforming after application of the coating, which has not been possible up to the present time owing to insufficient adhesion of coatings.

The composition in accordance with the invention for application of coatings, comprising polymethylmethacrylate dissolved in a solvent, is distinguished by the fact that said solvent is composed of at least one ketone selected from methylethylketone and diacetone alcohol and of a chlorinated hydrocarbon selected from trichloroethylene and methylene chloride, the ratio of the volume of chlorinated hydrocarbon to the volume of ketone being at least 20 to 80.

The proportion of ketone can be very low but it must not be entirely suppressed since the polymethylmethacrylate would then become very difficult to dissolve.

Dissolution is facilitated when the ratio of the volume of chlorinated hydrocarbon to the volume of ketone is at least 40 to 60 and preferably in the vicinity of 70 to 30.

The solvent composed of diacetone alcohol and of methylene chloride is particularly advantageous since evaporation of chlorinated hydrocarbon is slower than in the other solvents, thus greatly facilitating the use of the product and limiting the risk of arriving by evaporation at a solvent formula which constitutes a departure from the specified field and thus leads to insufficient adhesion of the coating after application.

The ratio of the volume of polymethylmethacrylate to the volume of solvent determines the viscosity of the composition and must be selected by the specialist as a function of the mode of application and of the thickness of the coating to be obtained. A ratio within the range of 5 to 10% is usually suitable.

After preparation of the composition, there can be added a complementary quantity of chlorinated hydrocarbon, either in order to reduce the viscosity of the composition or in order to compensate for evaporation of the chlorinated hydrocarbon.

The composition in accordance with the invention can further comprise additives adapted to the particular use which is contemplated, especially decorative elements such as pigments and metal particles, and fillers in the form of fibrous material, powdered or granular material and the like.

Objects having a base of acrylic resin such as polymethylmethacrylate in particular and provided with a coating formed at least partly of polymethylmethacrylate can be obtained by applying a composition in accordance with the invention on a substrate having a base of acrylic resin and by evaporating the solvent. Evaporation can be performed as desired, either at room temperature or at a higher temperature.

In accordance with a particularly advantageous feature of the invention, the composition is applied on a substrate having a flat shape and the coated object is thermoformed in order to obtain a final product having the desired shape such as for example a bathtub and provided with a decorative coating or with a reinforcement.

The thermoforming process can be carried out at a temperature of the order of 170° C. to 180° C.

The composition can be applied by the usual methods such as spray-coating, hand-coating or molding, depending on its viscosity. In the spray-coating process, an unfilled composition and a glass fiber filler can be sprayed simultaneously in order to obtain a coating or reinforcement in which the fibers are embedded in the polymethylacrylate.

EXAMPLE

A solvent was prepared by mixing 30 volumes of diacetone alcohol and 70 volumes of methylene chloride. To this solvent were added 5 volumes of polymethylmethacrylate in powdered form and the mixture was stirred at room temperature until final dissolution.

A liquid colorant which was miscible with the solution thus obtained was then incorporated in this latter.

The composition thus prepared had the consistency of oil having high fluidity.

It was applied by spray-gun on a plate of polymethylmethacrylate having dimensions of 80×180×0.5 cm.

After drying for 24 hours at room temperature, a coating having a thickness of 0.1 to 0.2 mm was obtained and exhibited perfect adhesion to the plate.

The plate thus coated was subjected to thermoforming at 172° C. in order to produce a bathtub having a decorative coating on its internal face.

No loss of adhesion or detachment was observed when a steel ball weighing 200 g was dropped onto the coating from a height of 1 m.

The invention is not limited to the embodiments which have been described in detail in the foregoing. It would be possible in particular for any one versed in the art to incorporate in the composition any constituents other than those mentioned above, whether they consist of additional resins which are soluble in the solvent, of auxiliary solvents or of other components. The choice would depend on the specifications of each particular application but would not constitute any departure either from the scope or the spirit of the invention.

What is claimed is:

1. A method for obtaining an object having a base of acrylic resin provided with a coating based on polymethylmethacrylate which comprises applying on a substrate having a base of acrylic resin a composition comprising polymethylmethacrylate dissolved in a solvent, wherein said solvent is composed of at least one ketone selected from methylethylketone and diacetone alcohol and of a chlorinated hydrocarbon selected from trichloroethylene and methylene chloride, the ratio of the volume of chlorinated hydrocarbon to the volume of ketone being at least 20 to 80, and evaporating the solvent, and wherein the substrate is flat at the time the coating is applied and the coated object is then subjected to a thermoforming process.

2. A method according to claim 1, wherein the substrate has a base of polymethylmethacrylate.

3. A method according to claim 2, wherein the composition is applied by spray-coating.

4. A method according to claim 3, wherein an unfilled composition and a glass fiber filler are applied simultaneously by spray-coating on the substrate.

5. A method according to claim 2, wherein the composition is applied by hand-coating.

6. A method according to claim 2, wherein the composition is applied by molding.

7. A method according to claim 1 wherein said ratio is at least 60 to 40.

8. A method according to claim 7 wherein said ratio is approximately 70 to 30.

9. A method according to claim 1 wherein said ketone and said chlorinated hydrocarbon are respectively diacetone alcohol and methylene chloride.

10. A method according to claim 1 wherein the ratio of the volume of polymethylmethacrylate volume of solvent is within the range of 5% to 10%.

11. A method according to claim 1 wherein said composition further contains a pigment, or a filler, or both.

12. A method of claim 1 wherein said thermoforming is carried out at a temperature of about 170° C. to about 180° C.

* * * * *